(No Model.) 3 Sheets—Sheet 3.
P. K. STERN.
ROLL HOLDING CAMERA.
No. 588,611. Patented Aug. 24, 1897.
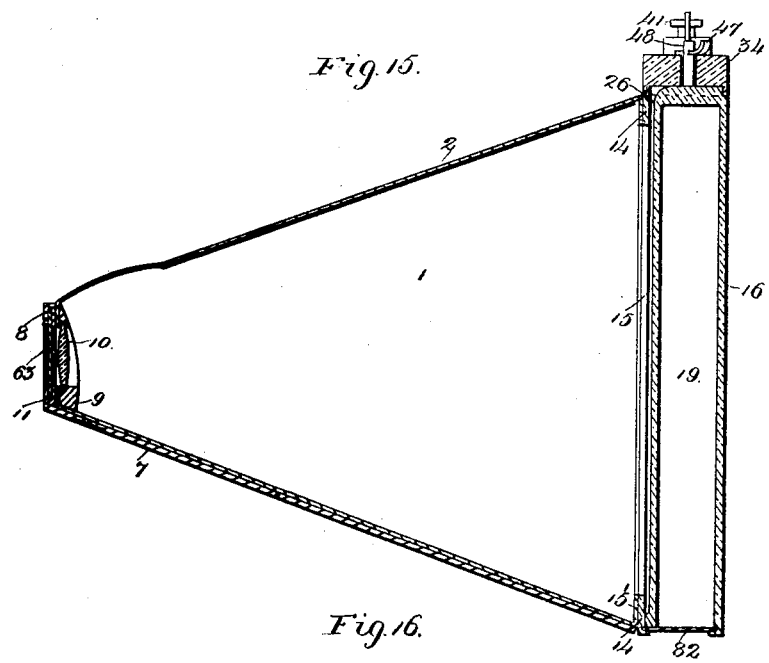
Fig. 15.
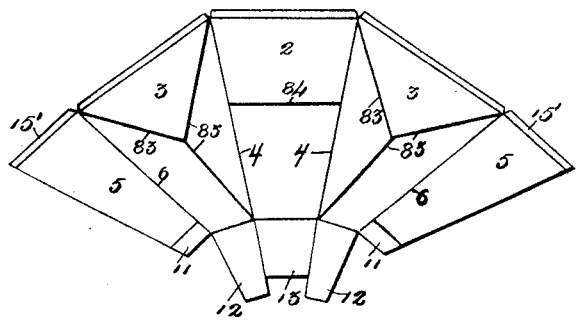
Fig. 16.
Fig. 17.
Witnesses
Alfred A. Mathey
Frank Wells
Inventor
P. K. Stern.
By his Attorneys,
Kellert Starek
THE NORRIS PETERS CO., PHOTO-LITHO., WASHINGTON, D. C.

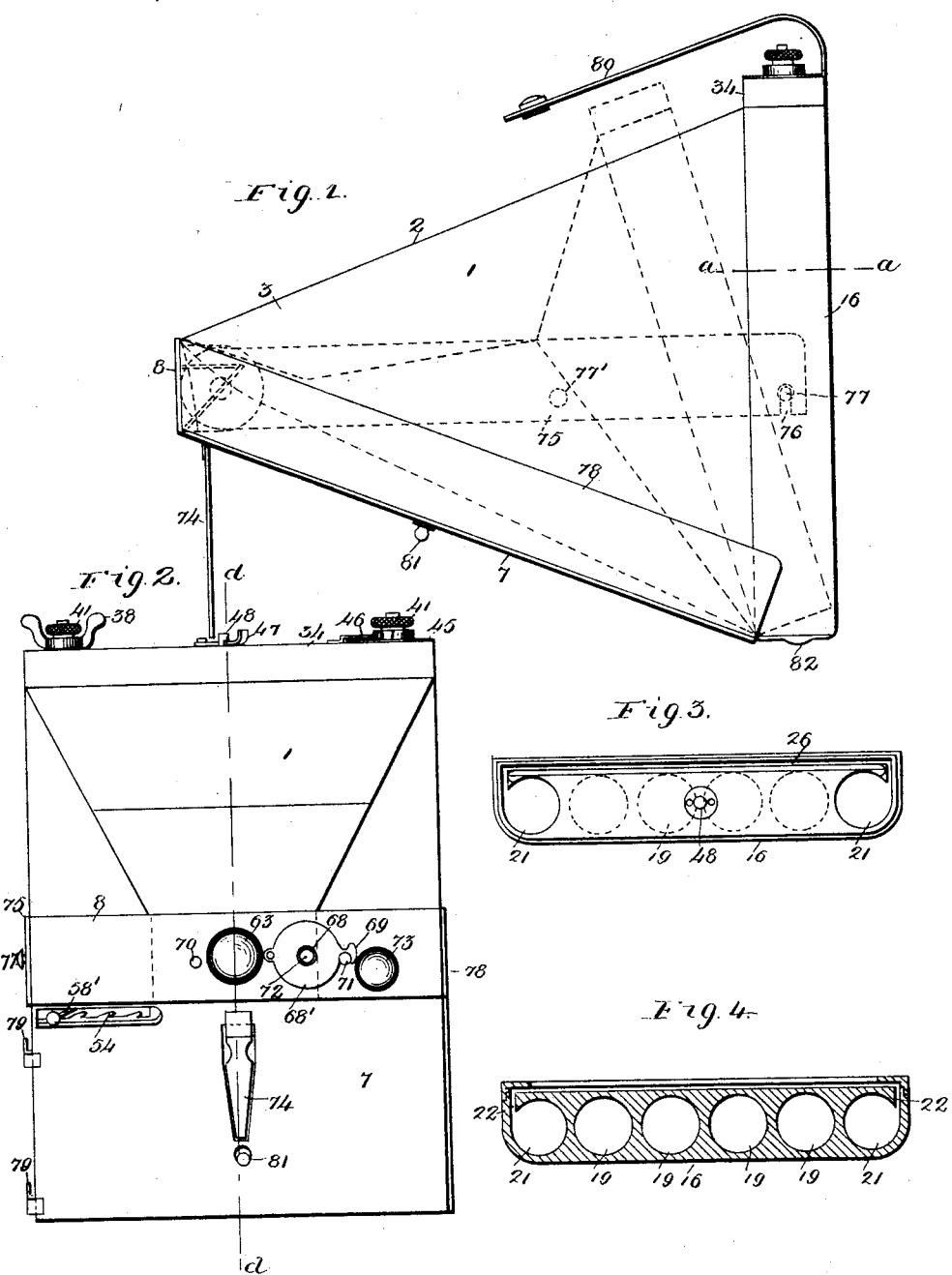
(No Model.) 3 Sheets—Sheet 1.
P. K. STERN.
ROLL HOLDING CAMERA.
No. 588,611. Patented Aug. 24, 1897.

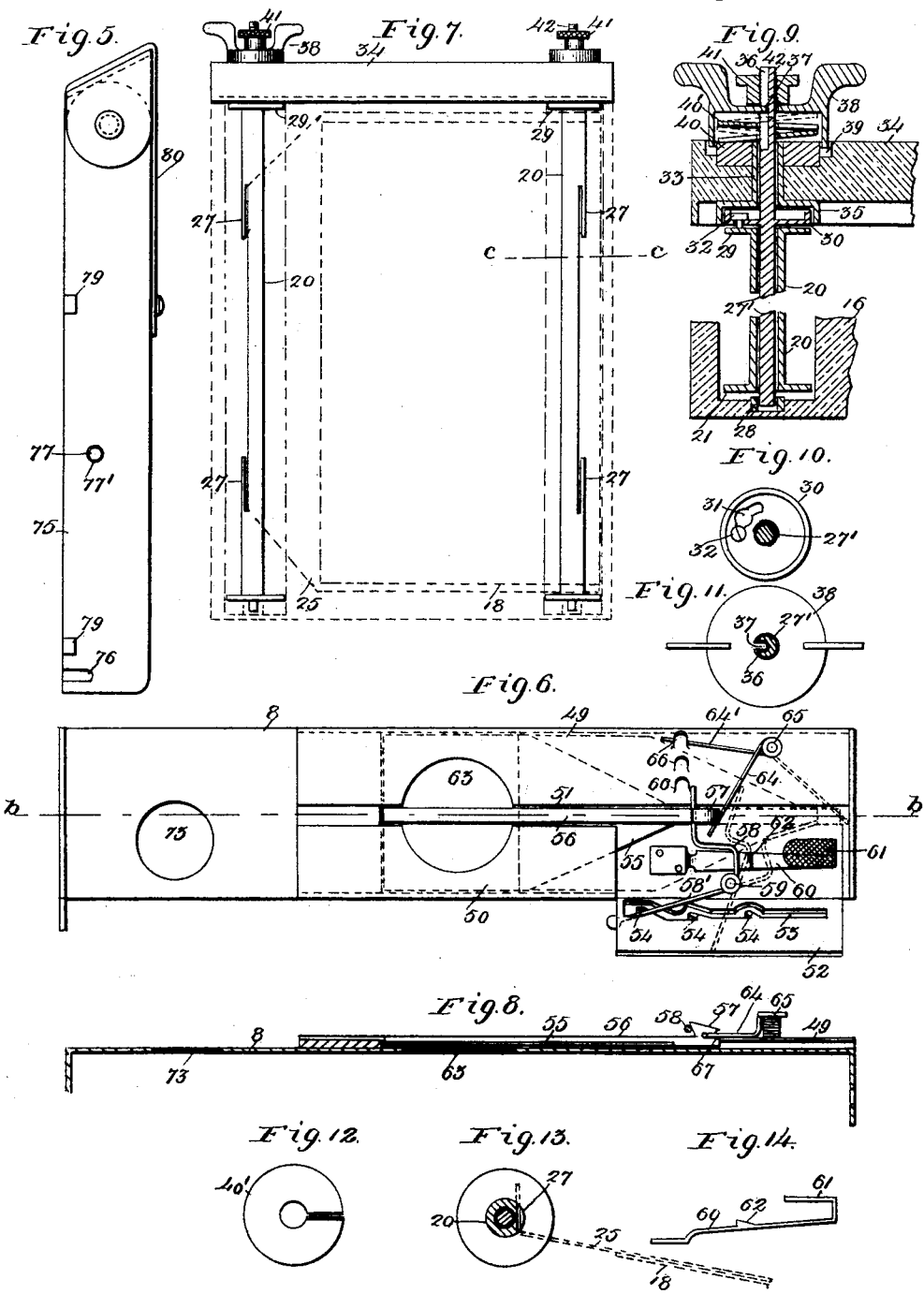

United States Patent Office.

PHILIP K. STERN, OF ST. LOUIS, MISSOURI, ASSIGNOR TO THE STERN
MANUFACTURING COMPANY, OF SAME PLACE.

ROLL-HOLDING CAMERA.

SPECIFICATION forming part of Letters Patent No. 588,611, dated August 24, 1897.

Application filed November 11, 1895. Serial No. 568,521. (No model.)

*To all whom it may concern:*

Be it known that I, PHILIP K. STERN, a citizen of the United States, residing at St. Louis, in the State of Missouri, have invented certain new and useful Improvements in Photographic Cameras, of which the following is a full, clear, and exact description, reference being had to the accompanying drawings, forming a part hereof.

My invention in photographic cameras relates more particularly to that class known as "collapsible" or "folding" cameras and to certain improvements in the exposure and non-exposure chambers, (or holder in which the sensitized material is retained and shielded from light,) the appliance for indicating the divisions between the exposures and in the manner of introducing the sensitized material to the exposure-chamber, and in general the various appliances and mechanisms for facilitating the operation and storage of the sensitized material.

The object of my invention is, first, to reduce the dimensions of the camera when folded within certain limits without reducing its capacity or the dimensions of the photographic negative obtained therefrom to a greater extent than has hitherto been accomplished in the old way; second, to simplify the operation of the camera by improving the facilities for the loading and discharging of the sensitized material, and, third, to simplify the general mechanical construction of the camera throughout.

Various features of my invention will be seen by referring to the drawings which form a part of this specification, and will be pointed out more fully in the claims.

Referring to the drawings which represent one of my improved cameras as intended for the pocket, which, as here represented, is of the fixed-focus type, Figure 1 is a side elevation of the same in an open position and as used when about to make an exposure, the dotted lines showing the same in a partly-closed position. Fig. 2 is a front elevation of the same, showing the lens-aperture, view-finder, and operating-key. Fig. 3 is a top plan view with non-exposure-chamber cover and reels removed, showing the interior of non-exposure-chamber. Fig. 4 is a transverse section taken on the line $a\,a$ of Fig. 1. Fig. 5 is a side elevation of my improved camera closed. Fig. 6 is a detailed back view of the operating-shutter, somewhat enlarged, the dotted lines showing the throw of the spring controlling-arms during their cycle of operation. Fig. 7 is a side elevation of the holder and rolls carried thereby, showing in dotted lines the backing-sheet for the protection of the film, the end of which is shown inserted under the clip of the feed-roll. Fig. 8 is a longitudinal section taken on the line $b\,b$ of Fig. 6. Fig. 9 is an enlarged section of the end of the roll-holder cover and reel carried thereby. Fig. 10 is a detailed view of the coupling-disk, showing the manner of securing the same to the roll. Fig. 11 is a detailed plan view of the operating-key or thumb-nut connected to the rotating spindle. Fig. 12 is a top plan view of a spring friction-washer operating in connection with the reel-spindle. Fig. 13 is an enlarged transverse section taken on the line $c\,c$ of Fig. 7 of a reel, showing the manner of securing the backing-sheet of the film to the same. Fig. 14 is a side elevation of the releasing-trigger operating in connection with the shutter. Fig. 15 is a vertical longitudinal section, taken on the line $d\,d$, Fig. 2, showing the mechanical construction of the two chambers and the manner of securing the leather, the roll-holder, shutter, and lens. Fig. 16 is a plan view of the blank which forms the flexible portion of the exposure-chamber and margins which form the hinges when the two chambers are united, showing also the lines along which the sections constituting the walls of the exposure-chamber fold when the camera is closed; and Fig. 17 is a transverse section of the non-exposure chamber corresponding to Fig. 4, but showing more clearly the manner of uniting thereto the frame in the rear of the exposure-chamber.

Similar numerals of reference relate to similar parts throughout the several views, wherein—

1 is the exposure-chamber, formed, preferably, of leather, the top wall 2 of which and lateral walls 3 of which are formed by folding a blank such as shown, Fig. 16, along lines indicated by 4 in said figure. The extreme segments 5 (illustrated in said figure) when folded along the lines 6 form a wall directly opposite the wall 2 and of equal dimensions therewith, giving a pyramidal form to the chamber, as best shown in Fig. 15. The wall formed by the segments 5 is made rigid by securing to the exposed surfaces thereof by gluing a plate 7, preferably of wood. Secured to and carried by the free edge of the rigid wall 7 is a transverse shutter-plate 8, and adjacent to the shutter-plate 8 and secured also along the free edge of the rigid wall 7 and disposed midway between the opposite ends of the shutter-plate is a lens-plate 9, carrying the photographic lens 10, as usual. A light-tight connection between the lens-plate 9 and the shutter-plate 8 is established by interposing between the said parts the upturned edges 11 of the narrow ends of the segments 5 of the blank composing the exposure-chamber on one side and by interposing on the other side the converging extension-pieces 12 12 and 13 of the segments 3 3 and 2, respectively, the several parts being firmly glued or otherwise made to adhere to one another.

The marginal portions of the expanded ends of the several segments composing the leather blank of which the chamber 1 is formed are secured to the rear frame 14 of the exposure-chamber 1 about the opening 15 of said frame. The marginal portions 15' of the segments 5 of the blank thus form a hinge for the rigid wall 7, secured to the frame 14, which arrangement, coupled with the peculiar form of the leather blank, enables me to fold the several parts about the hinged line, as seen by the dotted lines, Fig. 1, into a more compact form than any of which I am at present aware.

Secured to the rear of the frame 14 is a block 16, preferably of wood, answering the purpose of a holder or non-exposure chamber, as subsequently more fully explained. The holder 16 is provided with a series of parallel cylinders or receptacles 19 open at the bottom and extending a suitable distance through the body of the holder, said receptacles being designed to retain in seclusion from light a spool 20, on which the sensitive photographic film is wound.

The holder 16 is additionally provided with terminal receptacles 21, open from the top and closed at the bottom and extending through the body of the block. These receptacles are adapted to contain one the feed and the other the supply reel. The film passes from the reel contained in one receptacle to that of the other over the inner surface of block 16, communication being effected with said surface and the receptacle 21 by a passage-way 22 approximately the full length of the receptacle and sufficient to accommodate the width of the film 18, the inner edges of the frame slightly overlapping the edges of the film and said openings 22 and shielding the film reeled into the receptacles 21 from light. (See Fig. 17.)

The film 18 is provided with the usual backing 25, (when using daylight-films,) which extends beyond its ends, so that when wound upon its reel 20 the overlapping free end of the backing is sufficient to extend the full width of the chamber between the passageways 22 and an amount in excess of this sufficiently to wrap about the opposite reel 20 to insure a firm connection therewith.

In practice the supply-reel is inserted into the receptacle 21, the overlapping portion of the backing referred to being inserted simultaneously through the passage 22, communicating with the receptacles of said supply-reel, said portion being first bent or creased to conform with the right-angle turn in the passage-way 22. By this manner of insertion the overlapping portion of the backing is guided in the passage-way 26, formed between the rear surface of the holder and the upper transverse member of the frame 14. The receptacles 21 being open at the top, communicating with each other in the manner already indicated, afford a ready means for inserting the reel and the film with a minimum of expenditure of time and labor. The free ends of the overlapping portions of the backing are cut convergingly at their sides, as indicated by the dotted lines, Fig. 7, to allow the same to be seized by the clips 27, forming a part of each reel, these clips are formed by cutting away the cylindrical outer tubular portion of each reel lengthwise to a sufficient depth to admit of a formation of the clips 27 between the portions thus cut and the perimeter of the cylinder. In order to effect a connection between the supply-reel and feed-reel the former, with the overlapping portion of the film-backing, is inserted into its holder in the manner above described until that part between the tapering edges, which is sufficient in width to fill the space between the bases of the clips, comes approximately in line with the passage 22, leading to the receptacle 21, designed to receive the feed-reel when the latter is held in position above the said receptacle and the tapering ends of the backing are inserted between the clips of said reel, after which both reels thus connected by the backing are simultaneously inserted into their respective receptacles.

Upon rotating the feed-reel it is obvious that the film will be wound thereon and correspondingly unwound from the supply-reel, thus feeding the film across the opening of the frame 14 in the rear of the exposure-chamber 1, the backing 25 serving in this instance not only to effect connection for the film between the two reels, but also to protect the film against abrasion during its passage over the rear corners of the surface of the holder located about the passages 22 at either side thereof.

The reels 20 are operated by mechanism particularly described as follows: Passing axially through each reel is a spindle 27', one end of which has a bearing 28 at the bottom of the receptacle 21. Forming an integral part of the spindle 27' and located adjacent to the terminal flange 29 of the reel is a flanged coupling-plate 30, having a buttonhole 31, the button 32 of which is carried by the flange 29, effecting a coupling between said flange and the plate 30 of the spindle. That portion of the spindle beyond the buttonhole-plate passes through a tubular bearing 33, carried by the transverse bar 34, which serves the purpose of a cover for the open ends of the receptacles and the passage-ways 22, leading therefrom, a light-tight connection between the holder 21 and said cover, as well as the frame 14, being effected by rabbeting the connecting portions, as most clearly shown in Fig. 15.

Forming an integral part of the tubular bearing 33 is a cup 35, adapted when the parts are properly assembled to embrace the coupling-plate 30, thus partially securing the exclusion of light that might otherwise find its way into the exposure-chamber 1. The spindle 27' extends somewhat beyond the tubular bearing 33, the extension having a longitudinal groove 36, which serves as a keyway for the tongue 37 of the thumb-nut 38, by which the spindle is adapted to be rotated. The thumb-nut 38 is chambered. The movement of said thumb-nut along the groove 36 is limited in one direction by the base of the circular groove 39, formed between the outer wall of the washer 40, embracing the upper end of the tubular bearing 33, and the inner wall of the circular opening cut in the upper surface of the bar 34 for its reception. Interposed within the said chamber of the washer 38 and embracing the grooved extension of the spindle are one or more split frictional washers 40', the resiliency of which is regulated by the adjusting-nut 41, threaded to the screw cut upon the end of the spindle end 42 of said extension, thereby creating more or less friction between the several parts, as may be required.

As the film is drawn across the rear of the exposure-chamber by the rotation of the feed-reel by means of the thumb-nut and spindle (the coupling between the spindle and reel being effected, as it is obvious, by the coupling-plate 30 and button carried by the reel) the friction of the split spring-washers between the respective surfaces against which they bear—viz., the surface of the washer 40' and the base of the chamber of the thumb-nut—serves to overcome the uncoiling tendency of the elastic film, said tendency being further resisted by the friction between the edge of the flange of the coupling-plate 30 and the cup 35, against which it is firmly pressed. Inasmuch as both reels are provided with frictional restraining-washers 40', whereby the uncoiling tendency of the film is resisted, the film will remain taut or tense under all conditions.

In order to indicate the division between the several exposures and to register the ordinal of the same, I provide a combined indicator and registering device controlled by the supply-reel, as follows: Coupled to the grooved projecting end of the spindle of the supply-reel in a manner identical to that in which the thumb-nut 38 is coupled to its spindle is an index-disk 45, the outer edge of which is provided with numerals from "0" to "6," an index-arm or pointer 46, secured by the bar 34, coöperating with said numerals. The distances which the numerals "0," "1," "2," "3," "4," "5," "6," are spaced must be ascertained by experiment with a view toward preserving a constancy in the divisions of the film successively exposed. Let us assume, for example, that when the supply-reel is full and the free edge of the overlapping portion of the backing that is to be wound upon the feed-reel has been inserted under the clips of said reel, as previously described, the pointer stands at a position which is marked "0." The feed-reel is then turned sufficiently to draw the film from the supply-reel the necessary distance to effect one exposure, at which point the index-arm shall register with what shall be marked "1" on the index-plate, it being understood, of course, from the proportions of the parts as they appear from the drawings that a trifle less than two revolutions of the supply-reel has been completed to effect the unwinding of a sufficient length of film for one exposure. To effect the second exposure, the supply-reel must be turned a fraction over two revolutions. At this point the index-plate shall be marked "2." The necessity for this increased amount of rotation to ascertain the position of each succeeding ordinal is apparent, since with every succeeding revolution of the supply-reel the diameter of said reel is being reduced in proportion to the quantity of film unwound therefrom, and consequently to properly index each succeeding exposure the supply-reel must be given an increasing number of turns by reason of the successive diminution of the circumference of the spool by which the length of each succeeding wrap of the film is directly affected.

To mark the ordinal for each of the succeeding exposures from "3," "4," "5," &c., the same method is resorted to—that is to say, starting with the index-arm pointing to the ordinal which indicates any previous exposure the feed-reel is rotated sufficiently to impart two revolutions and a fraction thereof to the index-plate, (the fractional increment beyond two revolutions of course being always increased in the determination of the ordinal of every subsequent exposure for reasons previously stated,) at which point the ordinal for the next exposure is marked.

The transverse bar or cover 34 is firmly held in position on top of the holder 16 by a latch 47, pivoted to said bar, engaging the terminal shoulder of the post 48, secured to the upper surface of the holder and passed through the body of the said bar. (See Figs. 2 and 15.)

I shall now proceed to describe the details of the shutter mechanism.

The shutter-plate 8 has formed integral therewith two inwardly-projecting portions 49 and 50, respectively, a longitudinal space 51 separating the adjacent edges of said portion. Adjacent to the folded portion 50 is a portion 52, deflected outwardly from the surface of said plate, making an obtuse angle with its surface—i. e., when the plate is in position on the camera the said portion 52 is countersunk into and forms a portion of the outer surface of the rigid wall 7. Thus countersunk the said portion 52 is provided with a guideway 53, along which are disposed a series of ratcheted teeth 54, the said way passing, of course, entirely through the portion 52 and the wall 7, by which it is secured. Guided between the folded portions 49 50 and the inner surface of the plate 8 is a wing 55, having at one extremity tapering edges. Secured to said wing 55 and adapted to travel in the space 51 is a rib 56, one end of which—viz., that adjacent to the tapering edges of the wing—is provided with a hook 57, the under surface of which is adapted to be engaged by a spring controlling-arm 58, the medial portion of which is wound about a headed pivot 59, secured to the plate 8, the other extremity 58' of which arm is adapted to engage any one of the series of ratcheted stops or teeth 54 above referred to, the maximum tension being imparted to said spring-arm when the free end of the extension 58' is set against the stop farthest removed from the pivoted pin 59. (See Fig. 6.) Secured to the plate 8 and interposed between said plate and the arm 58 is one end of an elastic trigger 60, having an upwardly-deflected portion 61 at its free end and serving as a thumb-button for depressing the same. Forming a part of the trigger and disposed approximately midway the length of the same is a transverse ratchet-tooth 62, which prior to the depression of the trigger engages the arm 58 and prevents the same which was then under tension from shifting the rib 56 (and the wing of which it forms a part) from the normally-closed position of the wing, which when closed covers the lens-aperture 63, cut in the shutter-plate. Upon the depression of the trigger, however, and consequent disengagement of the tooth 62 from the arm 58 the latter will suddenly throw open the wing of the shutter, as indicated in dotted lines, Fig. 6, from the hook 57, from the rib of which the free end of the arm 58 will disengage itself when the wing has reached the extreme limit of its throw. Upon the disengagement of the arm 58 from the wing, as stated, the latter is instantly returned to its former position by the free end of the tension-arm 64 of a spring coiled about a pin 65, similarly to the spring of the arm 58, the tension of said arm 64 being regulated by the free end of the extension 64' of the spring engaging with one of the series of lugs or lips 66, punched from the portion 49. The tension of the spring-arm 64, coiled about the pin 65, is considerably less than that controlling the arm 58, so that the resistance offered by the arm 64 to the opening movement of the wing is slight. It may be stated, however, that it becomes sufficiently great to return the wing to its closed position by the time the latter is released from its arm 58, by the outward movement of which the spring of said arm 64 becomes sufficiently wound to impart the necessary tension thereto.

The free end of the arm 64 is kept in constant engagement with the end of the rib 56 by means of the terminal groove 67, in which the said free end is adapted to bear. The operation of the wing as above stated constitutes one instantaneous exposure of the sensitive film. To reset the shutter for any subsequent exposure, the arm 58' is disengaged from the tooth 54 at which it has been set and swung about the pivot 59 through the slot or guideway 53, tilting back the arm 58 until the latter is again brought into engagement with the tooth 62 of the trigger, by which time the free end of the arm 58' will be at the extreme right of the passage-way 53 and the free end of the arm 58 will be in position to engage with the hook of the wing. The tension of the arm 58—that is to say, the winding up of the coil-spring of which it forms part—is restored by returning the arm 58' back to its original tooth. When the free end of the arm 58' is made to engage with the tooth 54 farthest removed from the pivot 59 thereof, or that indicated by the position it occupies in Fig. 6, the arm 58 will be under maximum tension, and when released by the trigger 60 will throw the wing of the shutter suddenly open to its full extent, when the free end of the arm will become wholly disengaged from the rib of the wing, as indicated by the dotted lines shown to the extreme right, Fig. 6.

The operation of the shutter, as we have seen, by the movements of the various parts as described coöperate with each other in the manner as we have seen so as to vibrate the wing across the lens-aperture, resulting in an instantaneous exposure of the film.

To make a time exposure, the arm 58' is set to one of the notches nearer the pivotal point 59, whereby less tension is imparted to the controlling-arm 58 while in engagement with the trigger, and when the trigger is depressed and the controlling-arm released, the same shall shift the wing, but not sufficiently far, however, to become disengaged from the hook thereof, thus preventing the return of the wing by the weaker spring-arm 64. The wing therefore remains open the required number of seconds, but not sufficiently to uncover the entire aperture 63, but only to leave uncovered the small aperture 68 when swung over the said aperture 63. (See Fig. 2.)

In making a time exposure the approximate position of the controlling-arm 58 is that as indicated by the intermediate dotted position of said arm of Fig. 6. To conclude the exposure—that is to say, to return the wing to its closed position—the arm 58' is manipulated along its slot 53 until the free end of the controlling-arm 58 disengages the wing, when the latter is returned by the spring-arm 64, as already described.

The stop used in making the time exposure, so as to improve the definition of the negative resulting from the exposure, consists in the present case of a perforated plate 68', pivoted adjacent to the edge of the opening 63, having a T-shaped latch 69, adapted to engage the pin 70 when the stop is swung over the aperture 63 and to engage a pin 71 when the stop-opening is in a position in which it is not used, as shown, Fig. 2. In each position the heads of the respective pins 70 71 serve to hold the stop-plate firmly against the shutter-plate 8 by reason of the springing action of the aforesaid latch against the inner surface of the heads of the pins. Any number of stop-plates may be pivoted to the same plate, and in Fig. 2 two such plates are shown superposed, the inner having an aperture 72 concentric with the aperture of the plate 68, but somewhat smaller.

A prismatic view-finder provided with a lens 73 is shown in the drawings, as is usual in hand-cameras.

When I desire to make an exposure of the film lengthwise of the reel, I provide a pivoted leg 74 to support the front end of the camera, as shown, Fig. 1. To brace the instrument when open, I pivot to the deflected end of the plate 8 a brace 75, having a notch 76, adapted to engage a pin 77, carried by the side walls of the holder, and when the camera is folded together, as shown, Fig. 5, the pin 77 snaps into the opening 77' of the brace, thus firmly locking it.

One edge of the wall 7 is provided with a strip 78, adapted to overlap the edge of the holder 8 when the camera is closed and to protect the folded edges of the leather of the chamber 1 when folded, it being understood that the brace 75 protects the leather on the opposite side, said brace being firmly held against the holder by the clips 79, Fig. 3.

To protect the lenses carried by the shutter-plate and to inclose the several parts, a flap 80, carried by the holder, is adapted to be fastened by a catch 81 when the camera is closed. It may be stated in passing that the receptacles, which are described as being open at the bottom, are adapted to be closed by a sliding plate 82, (see Fig. 15,) operating in a grooved way at the base of the holder 16.

The several receptacles 19 form a magazine for storing a reserve of spools or reels with film wound thereon.

In closing the camera the sections 3 of the blank of which the side walls of the chamber 1 are composed fold or collapse along the series of converging lines 83, and the section 2, which forms the top wall of the chamber, folds approximately along the line 84. After the chamber is formed and the extensions 12 12 and 13 of the original blank have been brought over and secured to the lens-plate the material of these extensions is cut away sufficiently to register with the lens-aperture 63.

An inspection of the dotted positions of the receptacle and collapsible walls of the chamber in Fig. 1 shows that as the rigid receptacle is swung in the direction to close toward the adjacent rigid wall 7 the collapsible walls will fold inwardly by the consequent angular approach of said receptacle and rigid wall, so that the same become fully protected by the rigid wall and receptacle hinged thereto; and as the length of the receptacle is somewhat less than that of the rigid wall 7 the shutter-plate 8 carried at the end of the rigid wall 7 will lap over the swinging edge of the receptacle, thus bringing the receptacle, upon the complete closing of the camera, between the shutter-plate and the hinge-line between the said receptacle and the rigid wall 7. The camera thus closes to a compact form and the collapsible walls thereof become fully protected. The receptacle of course forms one of the rigid walls of the camera-chamber.

In effect the rigid wall 7 and the receptacle form, respectively, the leaves of a hinge, the free end of the leaf formed by the rigid wall being adapted to carry the lens-plate and the inner surface of the receptacle being adapted to support the sensitized material, and the two leaves thus adjacently hinged being adapted to be connected by a light-excluding material—viz., the collapsible walls of the chamber 1.

By "rigid" of course is meant any quality of wall that is not "collapsible."

Having fully described my invention, so that those who are interested in the art to which it pertains may construct and use the same, what I claim as new, and desire to secure by Letters Patent of the United States, is—

1. In a photographic camera having an exposure-chamber composed of collapsible walls and hinged rigid walls, a lens situated at one extremity of said chamber, a receptacle for sensitized material at the opposite extremity of said chamber, a rigid wall located adjacent to said receptacle and hinged thereto, the chamber being adapted to collapse upon the angular approach of said receptacle and rigid wall hinged thereto, substantially as set forth.

2. In a photographic camera having an exposure-chamber composed of collapsible walls and hinged rigid walls, a lens situated at one extremity of said chamber, a rigid receptacle for sensitized material at the opposite extremity of said chamber, a rigid wall located adjacent to said receptacle and hinged thereto, the said chamber being adapted to collapse upon the angular approach of said receptacle and the rigid wall hinged thereto, substantially as set forth.

3. In a photographic camera having an exposure-chamber composed of collapsible walls and hinged rigid walls, a lens situated at one extremity of said chamber, a rigid receptacle for sensitized material at the opposite extremity of said chamber, spools adapted to be carried within the receptacle for mounting said sensitized material, a shutter for the lens, and a rigid wall located adjacent to the receptacle and hinged thereto, the said chamber being adapted to collapse upon the angular approach of said receptacle and the rigid wall hinged thereto, substantially as set forth.

4. In a photographic camera having an exposure-chamber composed of collapsible walls and hinged rigid walls, a lens situated at one extremity of said chamber, a rigid receptacle for sensitized material forming a rigid wall at the opposite extremity of the chamber, a suitable roll carried by the receptacle for said sensitized material, means for passing successive lengths of said sensitized material over the surface of the receptacle which is adjacent to the exposure-chamber, and a rigid wall located adjacent to the receptacle and hinged thereto, the said chamber being adapted to collapse upon the angular approach of said rigid receptacle and the rigid wall hinged thereto, substantially as set forth.

5. In a photographic camera having an exposure-chamber composed of collapsible walls and hinged rigid walls, a rigid wall having a hinge at one extremity, and a lens-plate at the opposite extremity, a lens secured to the lens-plate, a shutter for the lens, a receptacle for sensitized material located adjacent to the rigid wall and secured to the hinge thereof, the receptacle having an opening for admission of the sensitized material to said exposure-chamber, and means for securing the exposure-chamber in an open position, substantially as set forth.

6. In a photographic camera having an exposure-chamber composed of collapsible walls and hinged rigid walls, a lens situated at one extremity of said chamber, a receptacle for sensitized material at the opposite extremity of said chamber, a rigid wall located adjacent to the receptacle and hinged thereto, the chamber being adapted to collapse upon the angular approach of said receptacle and rigid wall, substantially as set forth.

7. In a photographic camera having an exposure-chamber composed of collapsible walls and hinged rigid walls, a light-excluding envelop provided at one extremity with a lens having a shutter and at the opposite extremity with a receiver adapted to contain sensitized material, said sensitized material being adapted to be exposed to light upon the operation of said shutter, a rigid wall having an opening between the receiver and the said envelop located adjacent, and hinged to, a rigid wall of the latter at an extremity remote from the lens, the said light-excluding envelop adapted to collapse upon the inward swinging of the rigid walls about their hinged junction, substantially as set forth.

8. In a photographic camera having an exposure-chamber composed of collapsible walls and hinged rigid walls, and having an opening for the chamber, a cover for the opening of the chamber, a lens situated at one extremity of the chamber, a shutter for the lens, a rigid receptacle for the sensitized material located adjacent to, and hinged to a rigid wall of the exposure-chamber, the receptacle having an opening for the admission of the sensitized material to the exposure-chamber, the latter being adapted to collapse upon the angular approach of the hinged wall and said receptacle, substantially as set forth.

9. In a photographic camera having an exposure-chamber composed of collapsible walls and hinged rigid walls, the former being adapted to fold inwardly upon the angular approach of the hinged rigid walls, a lens carried at one extremity of said chamber opposite the hinge-line between said rigid walls, a receptacle for sensitized material carried by, or forming the rigid wall opposite that extremity of the chamber occupied by the lens and located adjacent to the rigid wall hinged thereto, whereby upon the collapse of the chamber, the receptacle shall be disposed between the lens and the hinge-line between the rigid wall and the receptacle, substantially as set forth.

10. In a photographic camera having a collapsible dark chamber composed of pliable material in part, a rigid plate or frame internally situated at one extremity and adapted to support the pliable material thereat, a lens-support for the plate having a lens, a shutter for the lens, an external rigid plate or frame connected to the said internal plate or frame and adapted to support the latter, a third rigid plate or frame oppositely situated to the said internal plate or frame, and secured to the pliable material and external plate or frame, the said pliable material adapted to form a hinge at the junction of the rigid frames and pliable material, whereby upon an angular inward movement of the said third frame and the said external plate or frame, the said pliable part of the said dark chamber shall close inwardly, substantially as set forth.

11. In a photographic camera, a roll-holder having suitable supply and feed reels, an adjustable and variable friction-brake to restrain the rotation of said supply-reel, said brake comprising a fixed and a movable member, a coupling forming an integral part of the brake and constituting the movable member thereof, and suitable means for connecting the coupling with the reel, substantially as set forth.

12. In a photographic camera, a roll-holder having suitable supply and feed reels, adjustable and variable friction-brakes for the reels adapted to be regulated from without the roll-holder, each brake comprising a fixed and a movable member, a coupling forming an integral part of the brake and constituting the movable member thereof, and suitable connections between the coupling and the reel, substantially as set forth.

13. In a photographic camera, a suitable holder, receptacles in the same open at one end for the insertion of suitable reels, a frame forming simultaneously the rear of the exposure-chamber and the front of the chamber carried by said holder, the sides of said frame being slightly removed from the inner surface of the holder whereby a suitable passage is formed between the sides of the frame and the inner surface of the holder for guiding the film along the inner surface of the holder, substantially as set forth.

14. In a photographic camera, a roll-holder having suitable supply and feed reels, a film adapted to be passed from one reel to the other, adjustable and variable friction-brakes for the reels, each brake comprising a fixed and a movable member, a coupling forming an integral part of the brake and constituting the movable member thereof, means for detachably connecting the coupling with the reel, and suitable devices for varying the tension of the brake from the outside of the roll-holder, substantially as set forth.

15. In a photographic camera, having an exposure-chamber composed of collapsible walls and hinged rigid walls, a hinge between two adjacently-located rigid walls, a lens located at the free end of one of said hinged rigid walls and adjacent to the collapsible walls, the other hinged rigid wall opposite the lens being adapted to carry sensitized material, substantially as set forth.

16. In a photographic camera, a suitable receptacle, a rigid wall located adjacent to the same and hinged thereto, whereby two leaves about a common hinge are formed, a collapsible light-excluding envelop connecting said leaves, and a lens-plate carried by the free end of the rigid wall, that is at the end remote from the receptacle, substantially as set forth.

17. In a photographic camera, a suitable blank composed of a series of converging sections adapted to form the walls of the exposure-chamber, and suitable converging extensions forming a part of the sections composing the top and side walls of the chamber, a lens-plate for the exposure-chamber, said extensions adapted to be folded over and secured to the outer wall of the lens-plate, substantially as set forth.

18. In a photographic camera, a suitable blank comprising a series of converging sections adapted to form the top and sides of the exposure-chamber, said blank adapted to fold along lines separating said sections, the said walls being collapsible and the side walls adapted to fold or collapse along a series of converging lines meeting approximately at the center of the wall, and the top wall adapted to collapse along a right line transverse to the general length of the section forming the same, when the exposure-chamber is folded, substantially as set forth.

19. In a photographic camera, a shutter comprising a suitable guideway having a longitudinal slit formed along one side of the same, a wing movable in said guideway, a rib forming a part of said wing and operating in said slit, a hook at one end of said rib, a controlling tension spring-arm adapted to bear against the under surface of said hook, an extension-arm for said spring-arm, a releasing device for the spring-arm upon the operation of which the spring-arm shifts the wing in one direction, and a suitable tension spring-arm bearing normally against the outer surface of the hook and adapted to shift the wing back to its normal position, substantially as set forth.

In testimony whereof I affix my signature in presence of two witnesses.

PHILIP K. STERN.

Witnesses:
ALFRED A. MATHEY,
E. STAREK.